United States Patent [19]

Lorriette

[11] Patent Number: 5,607,038
[45] Date of Patent: Mar. 4, 1997

[54] HYDRAULIC CONTROL VALVE ASSEMBLY

[75] Inventor: Patrick Lorriette, Jaux, France

[73] Assignee: Massey Ferguson S.A., Beauvais, France

[21] Appl. No.: 407,863

[22] Filed: Mar. 21, 1995

[30] Foreign Application Priority Data

Mar. 29, 1994 [GB] United Kingdom ............. 9406193

[51] Int. Cl.⁶ .................................................. F16D 25/12
[52] U.S. Cl. ........................................ 192/85 R; 137/456
[58] Field of Search .................................. 137/456, 457, 137/462; 192/85 R

[56]  References Cited

U.S. PATENT DOCUMENTS

| 3,971,404 | 7/1976 | Quarve ................................... 137/462 |
| 4,651,858 | 3/1987 | Horsch . |
| 5,036,965 | 8/1991 | Cortesi et al. ......................... 192/85 R |
| 5,131,514 | 7/1992 | Machida ................................ 192/85 R |

FOREIGN PATENT DOCUMENTS 2253254  9/1992  United Kingdom .

Primary Examiner—Rodney H. Bonck
Attorney, Agent, or Firm—MacMillan, Sobanski & Todd

[57] ABSTRACT

A hydraulic control valve assembly is described comprising a cut-off valve, a control valve and structure for connection to at least a supply line, a hydraulic apparatus line and a return line. The assembly is constructed and arranged such that the cut-off valve is bistable and controls flow of pressurised fluid from the supply line to the control valve, permitting it when primed and preventing it when closed, and the control valve controls the pressure of fluid supplied to the hydraulic apparatus line. In addition structure means are provided to initiate priming of the cut-off valve, complete the priming of the cut-off valve provided the supply line pressure is above a first predetermined pressure, and maintain the priming of the cut-off valve provided the supply line pressure remains above a second predetermined pressure.

9 Claims, 9 Drawing Sheets

HYDRAULIC CONTROL VALVE ASSEMBLY

BACKGROUND OF THE INVENTION

The invention relates to a hydraulic control valve assembly and particularly, although not exclusively, to one for use as a safety feature with a hydraulically actuated clutch of a vehicle such as an agricultural tractor.

Hydraulically actuated clutches are common in agricultural tractors and similar vehicles and machines. Without safety systems, however, there is the danger that the vehicle will be started with a gear engaged and that, as the hydraulic pressure builds up after the vehicles engine is started, the clutch will gradually be engaged and the vehicle will move off without the operator intending it to. Clearly such an occurrence could lead to damage to objects in the path of the vehicle or injury to people. It is therefore advantageous to incorporate a safety system which prevents the vehicle moving off without a positive action by the operator to permit it.

One such safety system is described in U.S. Pat. No. 4,396,099. The clutch control system described includes a shut-off valve which prevents the supply of pressurised fluid to the clutch until the clutch pedal has been depressed and released.

A further potential problem with hydraulically engaged clutches occurs when the hydraulic system of the vehicle fails and the supply pressure of the fluid falls. Once the supply pressure falls below a certain level the clutch will slip leading to overheating and damage.

It is an object of the present invention to provide an improved hydraulic control valve assembly which both prevents unintended engagement of a hydraulically activated apparatus and protects the apparatus from harm if the hydraulic supply pressure falls below a predetermined level.

SUMMARY OF THE INVENTION

Therefore, according to the present invention there is provided a hydraulic safety control valve assembly comprising a cut-off valve, a control valve and means for connection to at least a supply line, a hydraulic apparatus line and a return line, constructed and arranged such that:

(i) the cut-off valve is bistable and controls flow of pressurised fluid from the supply line to the control valve, permitting it when primed and preventing it when closed, and (ii) the control valve controls the pressure of fluid supplied to the hydraulic apparatus line, and wherein means are provided to:
(a) initiate priming of the cut-off valve;
(b) complete the priming of the cut-off valve provided the supply line pressure is above a first predetermined pressure, and
(c) maintain the priming of the cut-off valve provided the supply line pressure remains above a second predetermined pressure.

The hydraulic control valve assembly provides the advantage that it prevents supply of pressurised fluid to the hydraulic apparatus before the operator has taken steps to initiate the supply thus providing a safety feature. In addition the supply of pressurised fluid to the apparatus is not permitted unless the supply pressure is above a first predetermined pressure which is sufficient for good operation of the apparatus, and is cut-off if the supply pressure subsequently falls below a second predetermined pressure at which significant damage to the apparatus would occur. The hydraulic control valve assembly is particularly suitable for use with a hydraulically engaged main clutch of a vehicle such as an agricultural tractor.

The cut-off valve is preferably a poppet valve and the control valve is preferably a spool valve. The first predetermined pressure may be 12 bar and the second predetermined pressure may be 3 bar.

The means to initiate priming of the cut-off valve may comprise an operator controlled clutch pedal, linkage of the pedal to the control valve and the control valve itself. The means to complete the priming of the cut-off valve may comprise the poppet of the cut-off valve and the supply of pressurised fluid. The means to maintain the priming of the cut-off valve may comprise the supply of pressurised fluid.

BRIEF DESCRIPTION OF THE DRAWINGS

An example of a hydraulic control valve assembly according to the invention will now be described, by way of example only, with reference to the accompanying drawings in which.

DETAILED DESCRIPTION OF THE PREFERRED EMBODIMENT

Figure 1:
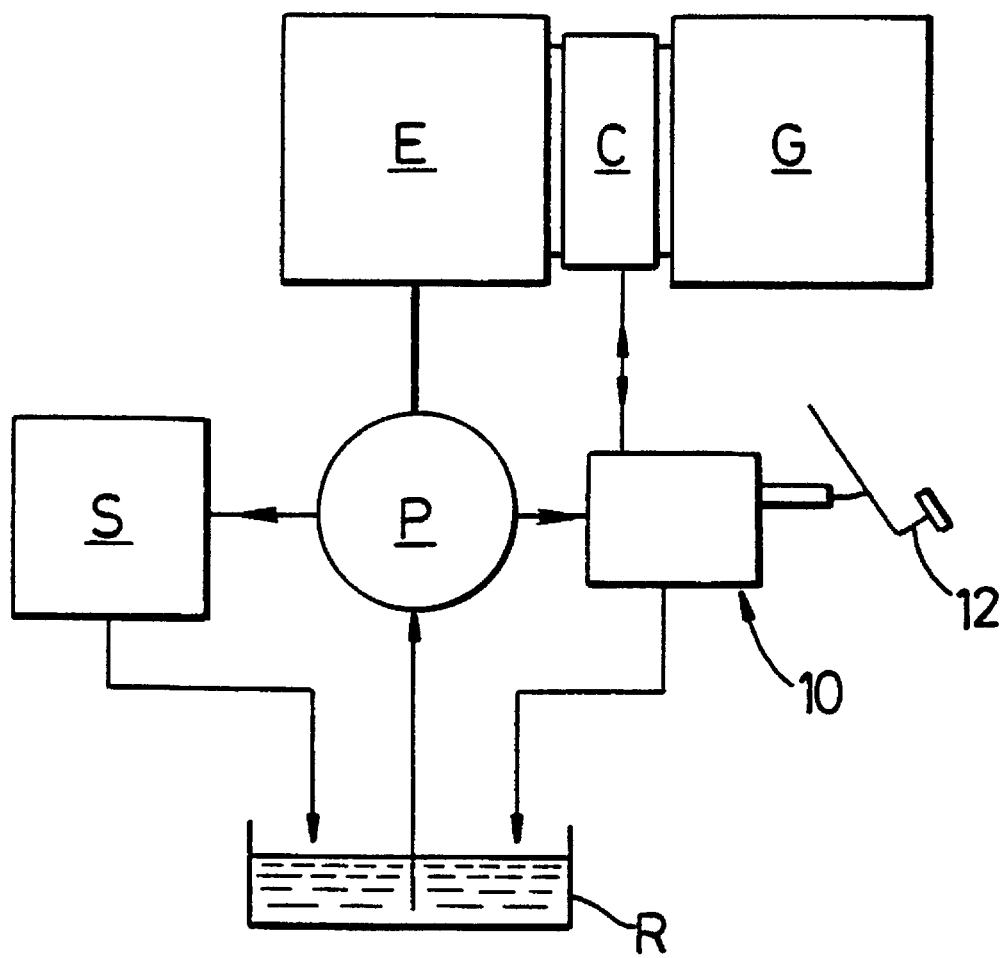
FIG. 1 is a schematic representation of a hydraulic circuit of an agricultural tractor incorporating a hydraulic control valve assembly according to the present invention.

Referring to FIG. 1, an agricultural tractor incorporates a diesel engine E connected to a gearbox G via a main clutch C. The clutch C is engaged hydraulically and disengaged by a spring, however, since the clutch forms no part of the present invention the details are not described. The engine E powers an hydraulic pump P which draws fluid from reservoir R and provides a supply of pressurised fluid to power hydraulic services S (e.g. steering and braking). The pump P also supplies pressurised fluid to the main clutch C via a hydraulic control valve assembly 10 according to the present invention. A clutch pedal 12 is provided, by which the tractor operator may control engagement and disengagement of the main clutch C, and which is connected to the assembly 10.

The hydraulic control valve assembly 10 is constructed such that supply of pressurised fluid to the clutch C cannot occur automatically on tractor start-up. The tractor operator has to take action to initiate the supply before the clutch C can be engaged. In addition, if the pressure of the fluid supply falls below a predetermined value the supply of fluid to the clutch C is cut. The construction and operation of the assembly 10 are described below.

Figure 2:
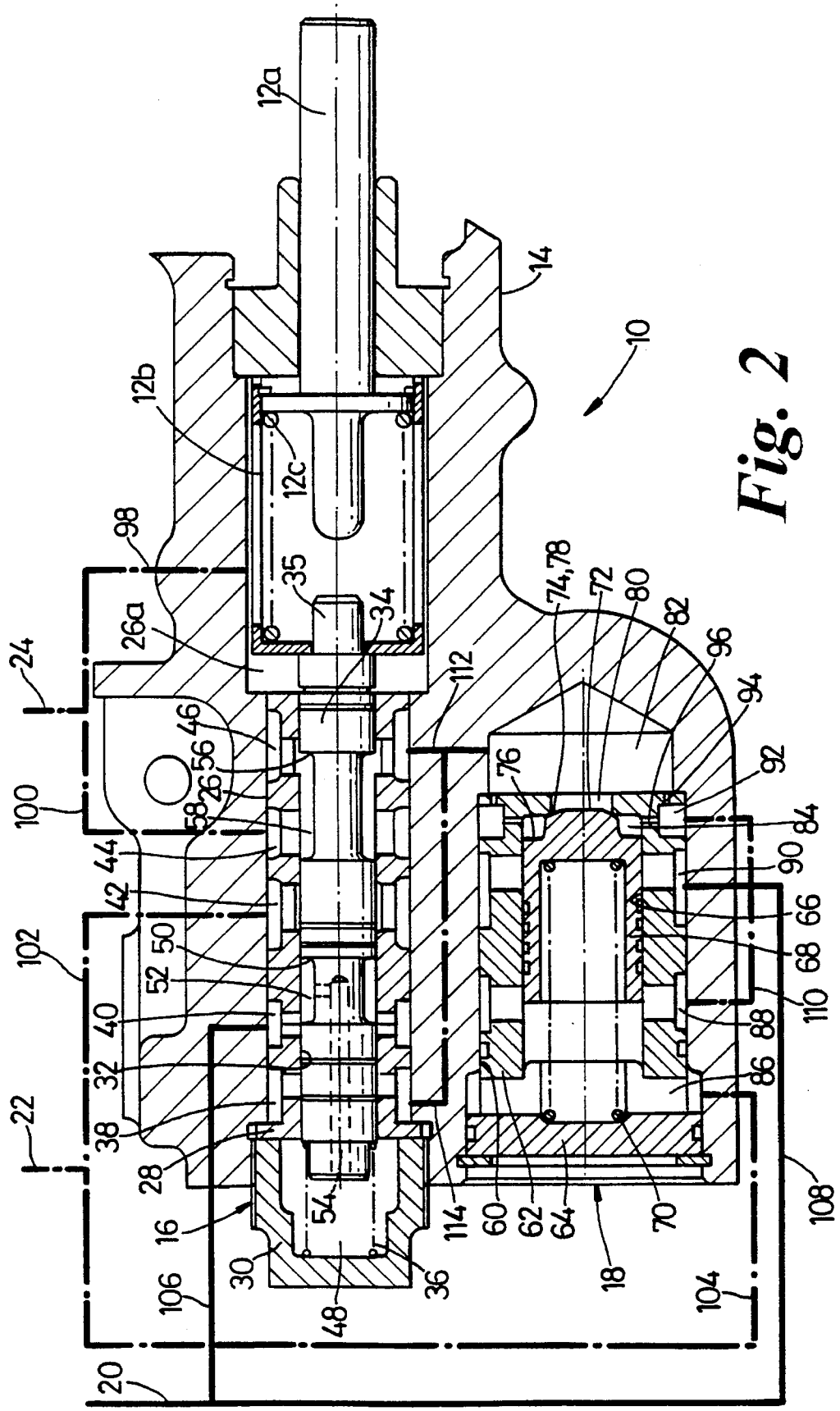
FIGS. 2 to 9 illustrate the hydraulic control valve assembly, using partial sectional views with schematic representations of fluid connections, showing it in various stages of its operation.

Referring now also to FIG. 2, the hydraulic control valve assembly 10 is illustrated. The assembly 10 incorporates a housing 14, a control valve 16 in the form of a spool valve and a cut-off valve 18 in the form of a poppet valve. Pressurised fluid is supplied to the assembly 10 by supply line 20 and fluid is returned to the reservoir R by return line 22. Connection with the clutch C is by clutch line 24.

The control valve 16 is formed in the left end, as shown in FIG. 2, of a first cylindrical bore 26 in the housing 14 by means of inserts 28, 30 which define a central cylindrical bore 32 in which a spool 34 slides. The spool 34 is acted on by the clutch pedal 12 via a plunger 12a and a spring box 12b (housing a compression spring 12c) which are located in a chamber 26a in the right end, as shown in FIG. 2, of the first bore 26. Cooperation between the spring box 12b and the spool 34 is ensured by means of a nipple 35 on the spool which protrudes into the spring box and a compression spring 36 to the left of the spool which biases the spool towards the spring box.

The control valve 16 has five ports 38, 40, 42, 44 and 46 (from left to right as seen in FIG. 2). A first chamber 48, in which the spring 36 is located, is present to the left of the spool 34. A first annular groove 50 around the spool 34 defines a second chamber 52 connected to the first chamber 48 by means of a bore 54 in the spool. A second annular groove 56 around the spool 34 defines a third chamber 58.

The cut-off valve 18 is formed in a second cylindrical bore 60 in the housing 14 by means of inserts 62, 64 which define a central cylindrical bore 66 in which a poppet 68 slides. The poppet 68 is biased to the right, as shown in FIG. 2, by a calibrated compression spring 70. At the right end, as shown in FIG. 2, the poppet has a central raised portion 72 of area S1, surrounded by an annular valving surface 74 and a further annular end surface 76 of area S2. When the spool 34 is fully to the right, as shown in FIG. 2, the valving surface 74 contacts valve seat 78 around port 80 thus defining chambers 82 and 84. The cut-off valve 18 has a further four ports 86, 88, 90 and 92 (from left to right as seen in FIG. 2). Port 92 is connected, by narrow passages 94 and 96, in insert 62, to chambers 82 and 84 respectively.

A number of passages 98, 100, 102, 104, 106, 108, 110, 112 and 114, within housing 14, connect ports together or to the supply, return or clutch lines 20, 22 and 24. These passages are represented schematically in FIGS. 2 to 9 by thick lines, of which solid lines indicate a connection to the supply line 20 and thus to the pump P, and chain lines indicate a connection to the return line 22 and thus to the reservoir R.

The connections formed by the passages are as follows: passage 98 connects the spring box chamber 26a to the clutch line 24; passage 100 connects port 44 of the control valve to the clutch line 24; passage 102 connects port 42 to the return line 22; passage 104 connects port 86 of the cut-off valve to the return line 22; passage 106 connects port 40 of the control valve to the supply line 20; passage 108 connects port 90 of the cut-off valve to the supply line 20; passage 110 connects together ports 88 and 92 of the cut-off valve; passage 112 connects chamber 82 of the cut-off valve to port 46 of the control valve whilst passage 114 connects port 38 of the cut-off valve to passage 112.

The operation of the hydraulic control valve assembly 10 will now be described with reference also to FIGS. 3 to 9 which, for clarities sake, in general include only those reference numerals used in the relevant portion of the description.

FIG. 2 illustrates the rest or starting position of the assembly 10, that is the position of the spool 34 and poppet 68 when the vehicle is at rest with the engine E switched off, the pump P is not operating and there is no pressurised fluid supply. The clutch line 24 is connected to the return line 22 via passage 100, port 44, chamber 58, port 46, passage 112, chamber 82, narrow passage 94, passage 110, port 88, chamber 86 and passage 104. This ensures that no residual fluid pressure is maintained in the clutch C.

Figure 3:
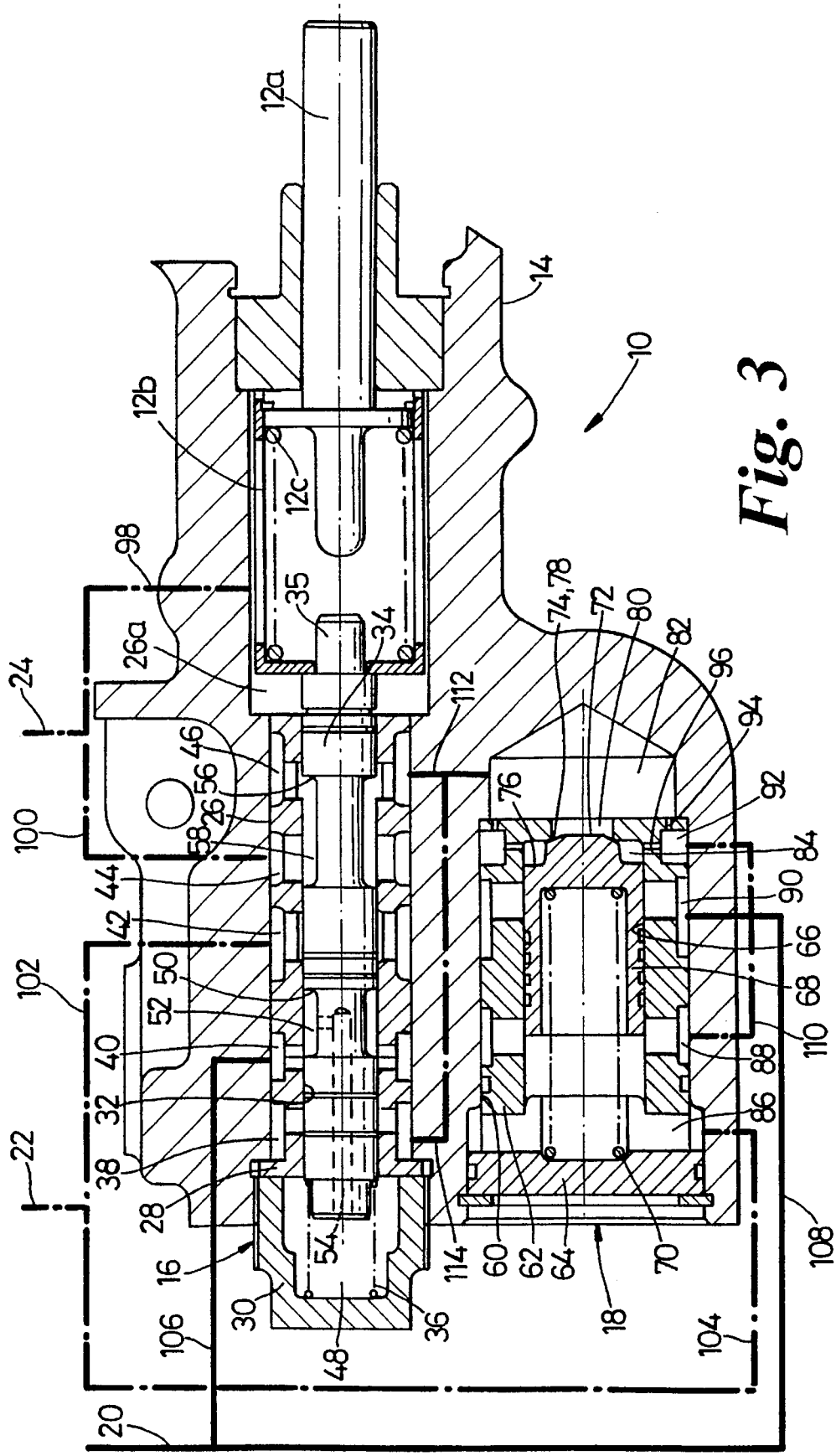

FIG. 3 illustrates the position of the assembly 10 on starting of the engine E. It should be noted that, despite the operation of the pump P and thus the supply of pressurised fluid, at a pressure of 17 bar, via supply line 20 and passages 106 and 108 to the control and cut-off valves 16, 18, there is no change to the position of the assembly 10 when compared to the rest position of FIG. 2. The pressurised fluid is supplied to port 40 of the control valve 16 via supply line 20 and passage 106. From port 40 it passes through chamber 52 and bore 54 into chamber 48 where, in conjunction with compression spring 36, it biases the spool 34 to the right. The pressurised fluid is supplied to port 90 of the cut-off valve 18 via passage 108 but this port is blocked by the poppet 68.

Figure 4:
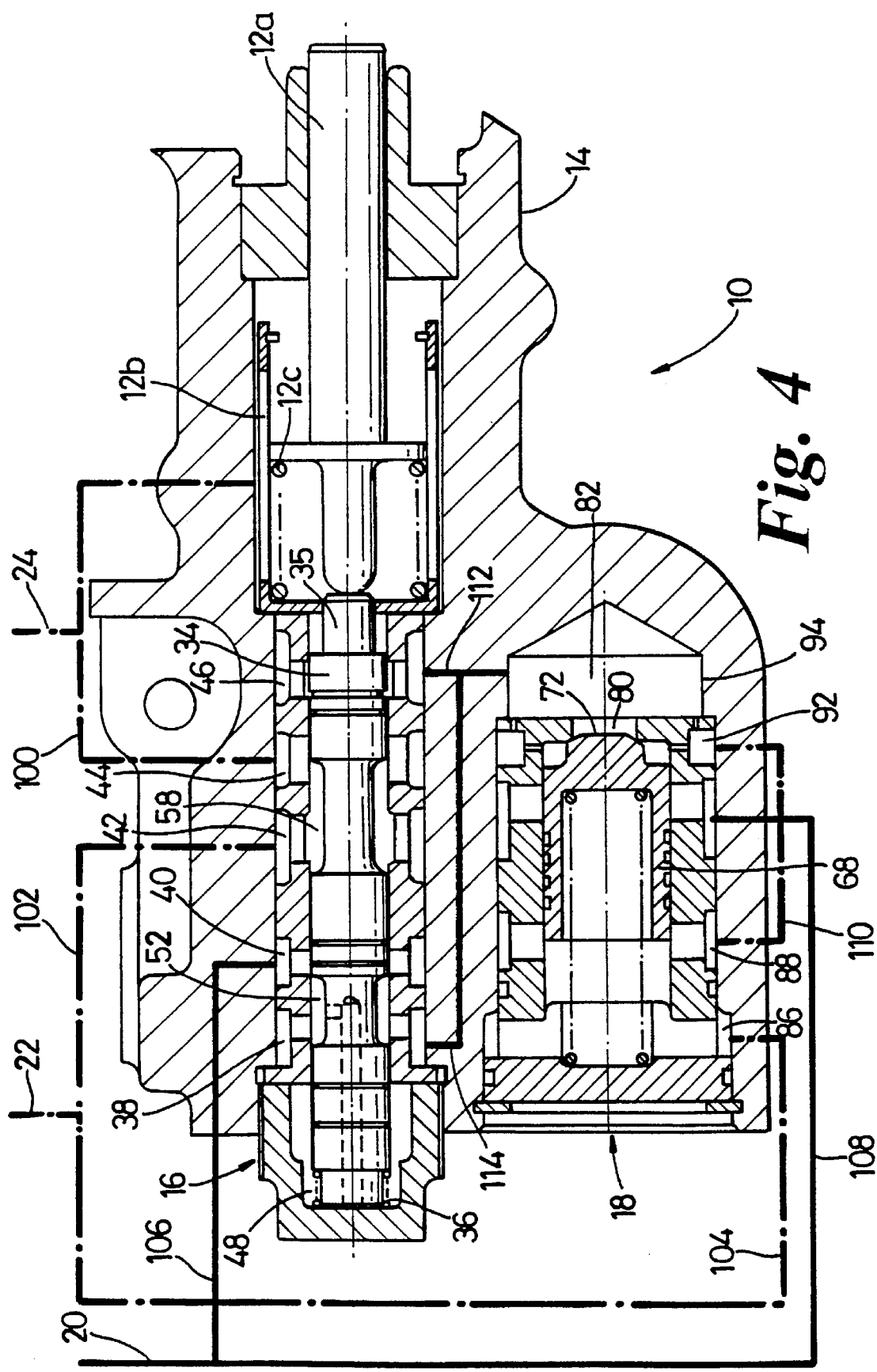

FIG. 4 illustrates the position of the assembly 10 during stage 1 of the priming of the cut-off valve 18, when the clutch pedal 12 is fully depressed by the vehicle operator. The plunger 12a is moved to the left such that the spring 12c is compressed, the spring box 12b is moved to the extreme left end of the chamber 26a, the plunger 12a is in contact with the nipple 35 and the spool 34 has thus been forced to the extreme left end of the chamber 48 against the bias of the compression spring 36 and pressurised fluid. The clutch line 24 is still connected to the return line 22 but this is now via passage 100, port 44, chamber 58, port 42 and passage 102, the movement of the spool 34 causing chamber 58 to connect ports 44 and 42 in place of ports 44 and 46. The movement of the poppet 34 has also caused chamber 52 to connect ports 40 and 38 thus enabling the flow of pressurised fluid from passage 106 to passage 114 and thence to passage 112 and to port 46 of the control valve and into chamber 82. Port 46 is blocked by the spool 34 thus preventing supply of pressurised fluid to the clutch line 24. The supply of pressurised fluid to chamber 82 ensures that the fluid acts, via port 80, on the central raised portion 72, of area S1 (See FIG. 5), on the end of the poppet 68. A small leakage of pressurised fluid from chamber 82 to the return line 22 occurs via narrow passage 94, port 92, passage 110, port 88, port 86 and passage 104.

Figure 5:
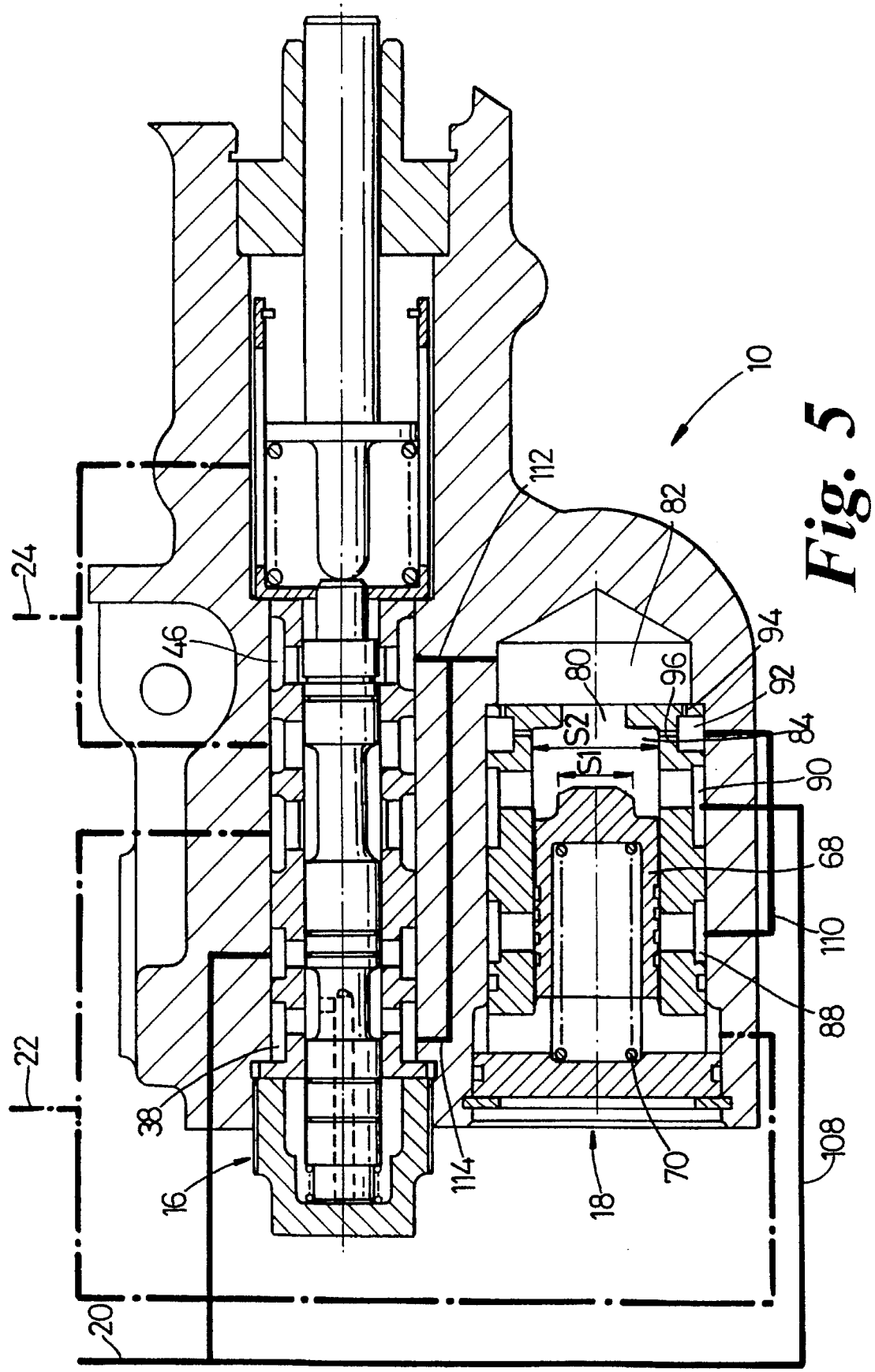

FIG. 5 illustrates the assembly 10 during stage 2 of the priming of the cut-off valve 18, when the clutch pedal 12 is still depressed by the vehicle operator. Despite the small leakage of pressurised fluid to the return line 22 the pressure acting on area S1 is sufficient to move the poppet 68 to the left against the bias of compression spring 70. The movement of the poppet 68 enlarges chamber 84 and connects it to ports 80 and 90. Thus pressurised fluid is supplied to ports 46 and 38 of the control valve 16 from line 108 via port 90, chamber 84, port 80, chamber 82 and passages 112 and 114 respectively. It is also connected to passage 110 via port 90, chamber 84, narrow passage 96 and port 92 and via port 90, chamber 84, port 80, chamber 82, narrow passage 94 and port 92. However, passage 110 is in turn connected to port 88 of the cut-off valve 18 which is blocked by the poppet 68.

Figure 6:
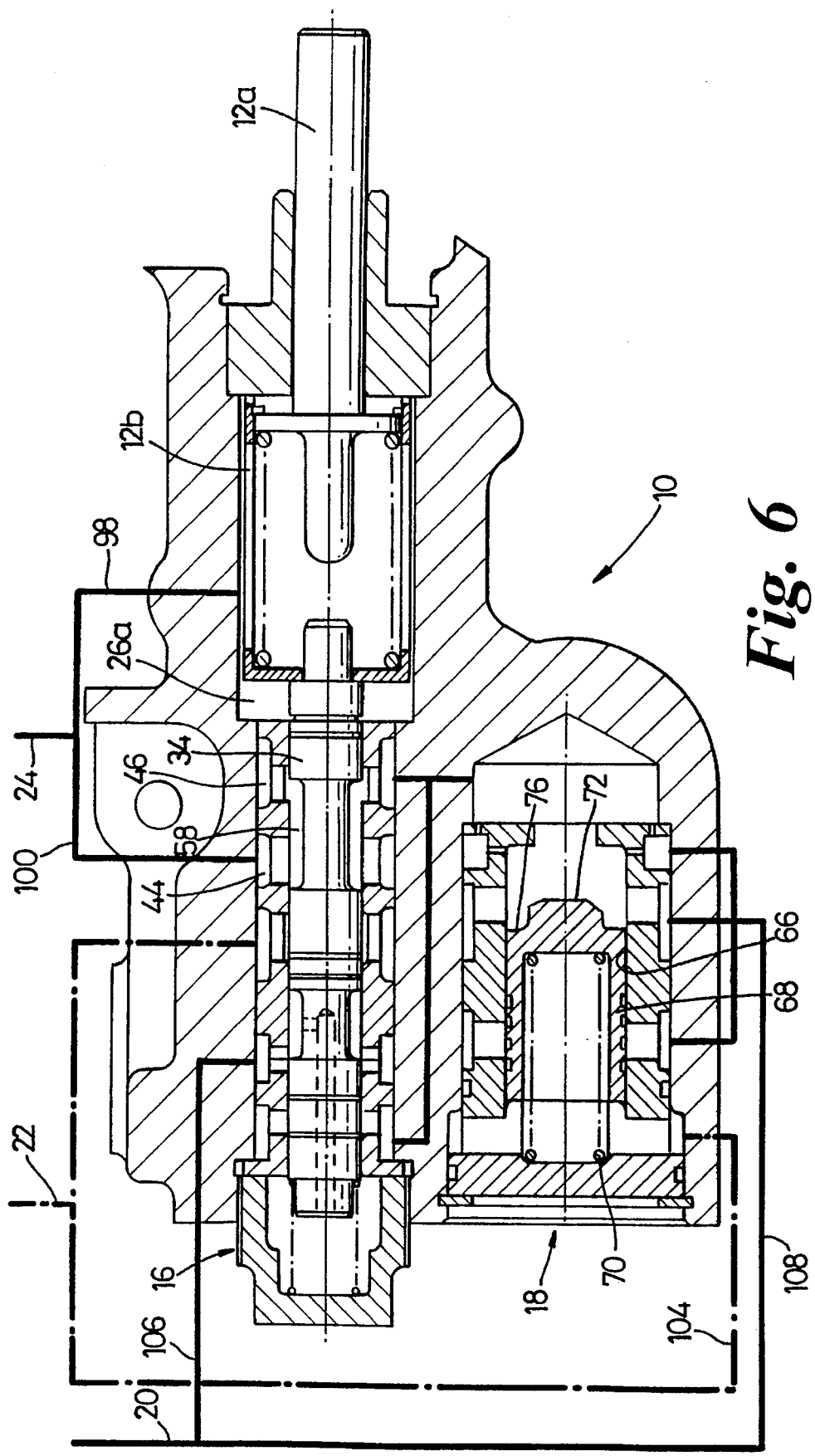

FIG. 6 illustrates the situation when the clutch pedal 12 is released by the vehicle operator leaving the cut-off valve 18 primed. The poppet 68 remains to the left in the bore 66, the pressurised fluid on the combined end surfaces 72 and 76, and therefore on area S1+S2 (See FIG. 5), being sufficient to hold the poppet against the action of the calibrated compression spring 70. The supply of pressurised fluid to the control valve 16 is therefore maintained unaltered from that illustrated in FIG. 5. Clearly, when the clutch pedal 12 is released, the plunger 12a, spring box 12b and spool 34 move to the right, returning to their original positions. This connects port 46, to which pressurised fluid is supplied, via chamber 58, to port 44 and thus to passage 100 thus supplying pressurised fluid to the clutch line 24. This also connects the spring box chamber 26a to the pressurised fluid supply via passage 98, this ensures that the vehicle operator has "feel" when using the clutch pedal 12.

Figure 7:
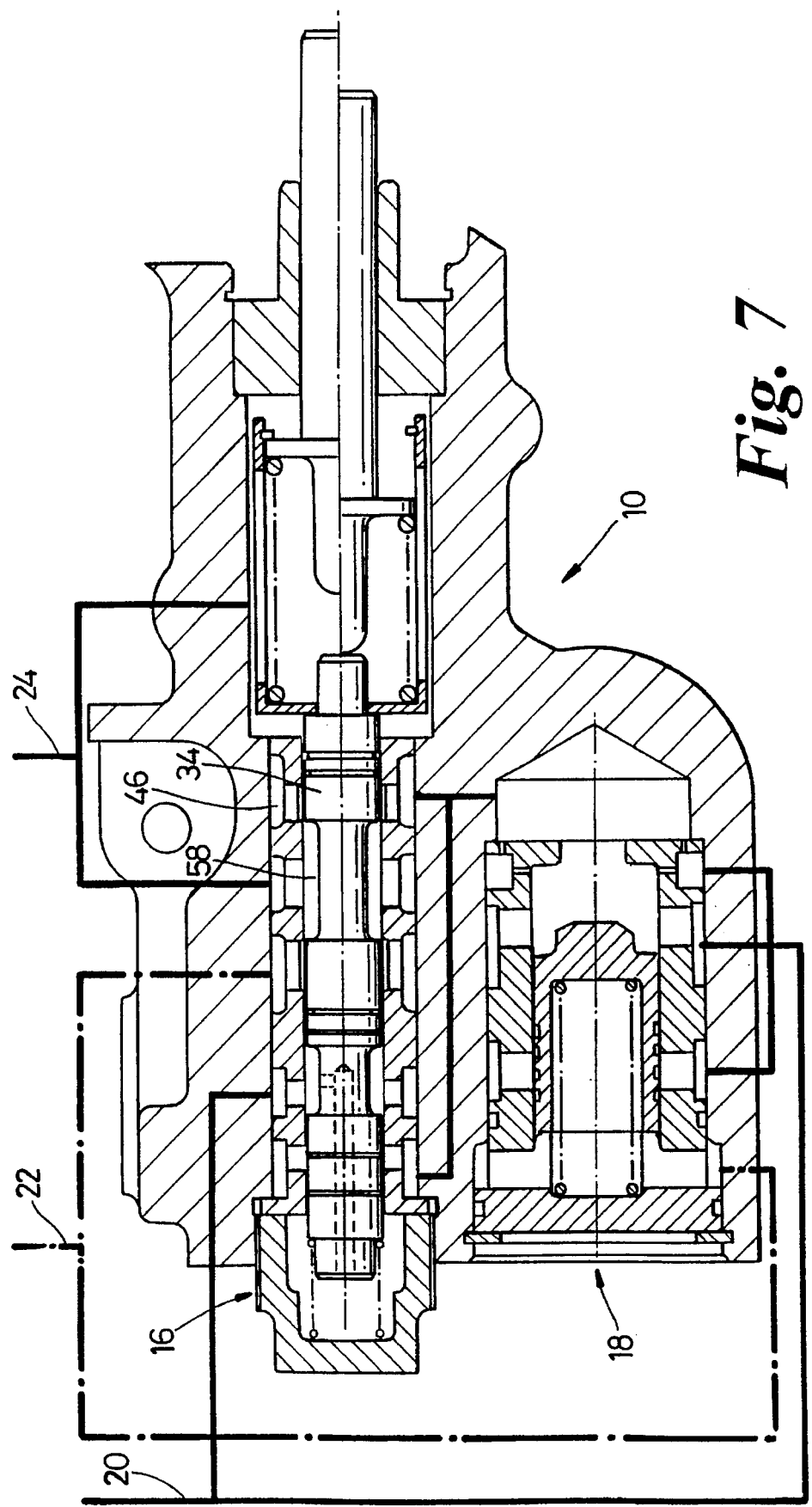

FIG. 7 illustrates the normal operation of the main clutch C by the vehicle operator. The plunger 12a is moved, by depression of the clutch pedal 12, within the range of movement indicated. This leads to movement of the spool 34 permitting fine control of the overlap between chamber 58 and port 46, and thus fine control of the supply of pressurised fluid to the clutch line 24.

Figure 8:
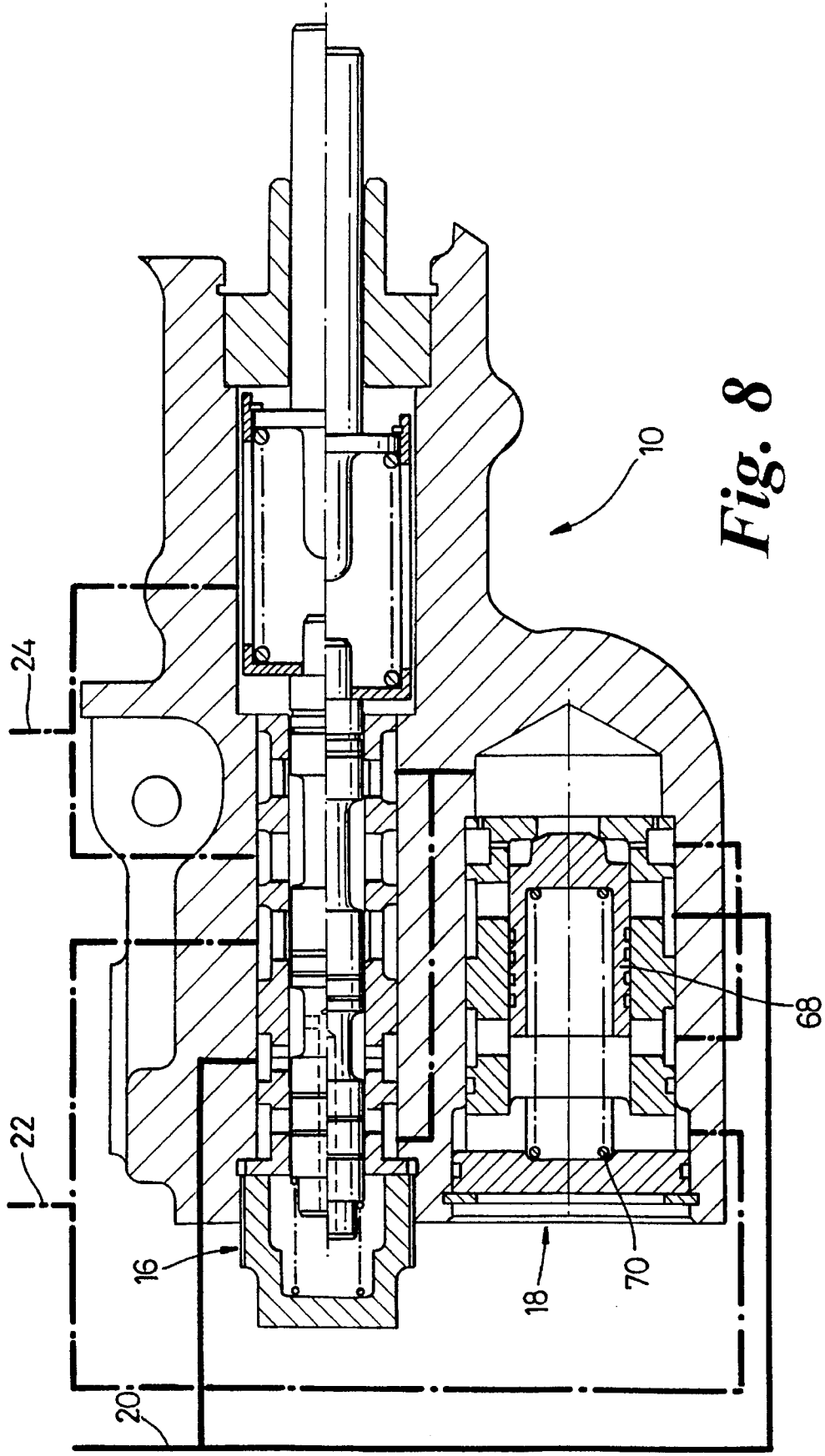

FIG. 8 illustrates the operation of the assembly 10 when the pump P fails and the supply pressure of the fluid falls below a predetermined limit as set by the calibrated compression spring 70. In the example shown the spring 70 is calibrated for a pressure of 3 bar. Thus when the supply pressure falls below 3 bar the pressurised fluid acting on end surface area S1+S2 of the poppet 68 is no longer sufficient to hold the popper 68 against the action of the spring 70 and the poppet 68 moves back to it's original position. This cuts off the supply of pressurised fluid to the clutch line 24 and connects the clutch line to the return line 22 as described for FIG. 2. Thus the clutch C is released in order to prevent uncontrollable slipping and thus serious damage.

Figure 9:
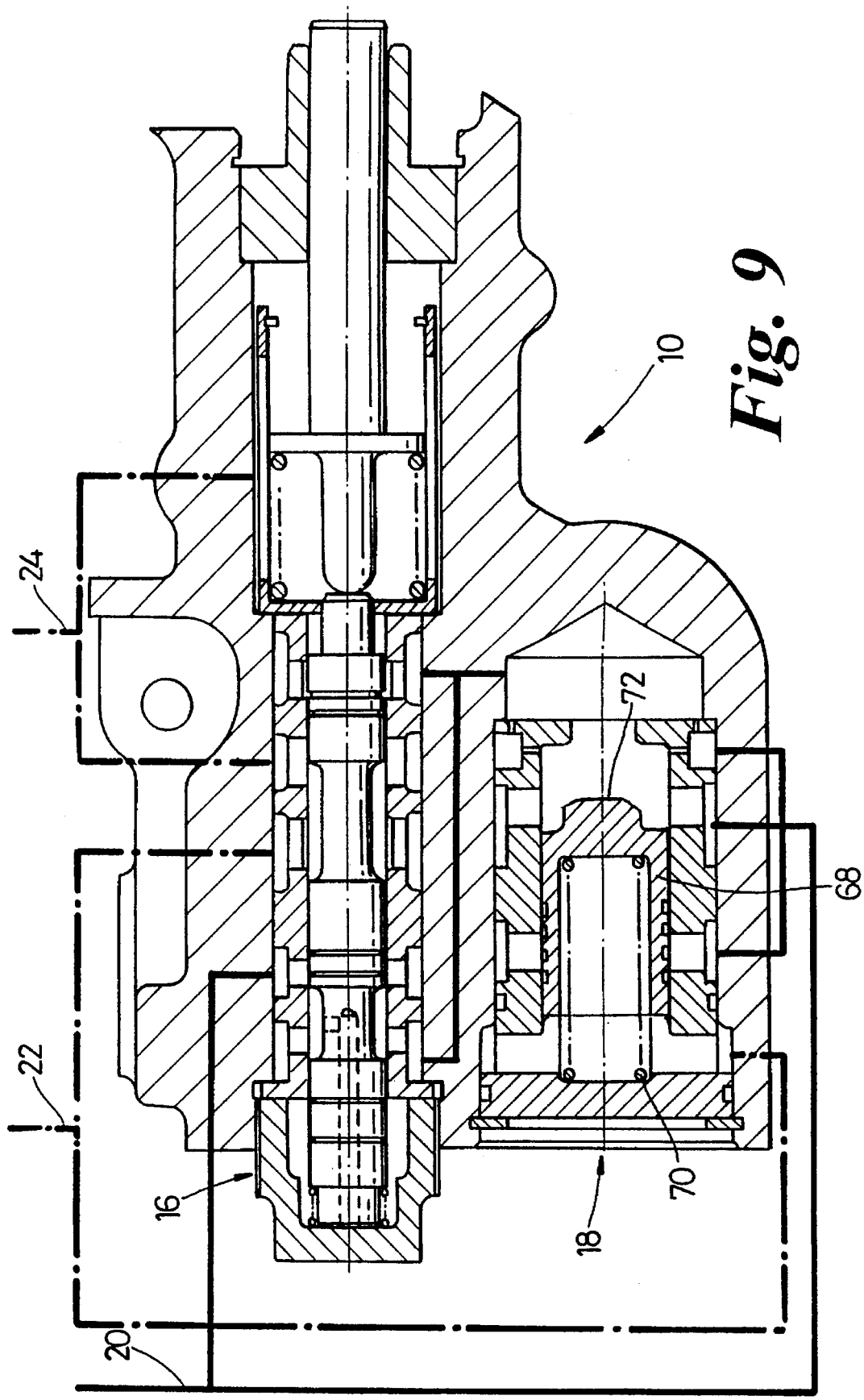

FIG. 9 illustrates that, in order to re-establish supply of pressurised fluid to the clutch line 24, the initial priming of the cut-off valve 18 by full depression of the clutch pedal 12, as illustrated in FIG. 5, must be repeated. This will only be successful if the supply pressure of the fluid has been restored to an adequate level to move the poppet 68 against the action of the spring 70 when the fluid is only acting on the central raised portion 72, of the popper end surface, of area S1. In the example illustrated the supply pressure must be restored to 12 bar.

The hydraulic control valve assembly 10 described above therefore provides an assembly which prevents supply of pressurised fluid to the clutch C unless (a) the operator has taken steps to prime the cut-off valve, and (b) the pressure of the fluid supply is above 12 bar, and which cuts off the supply of pressurised fluid to the clutch if the pressure of the fluid supply falls below 3 bar. Clearly the pressures at which the cut-off valve may be primed and at which it closes may be set according to the application of the assembly, the modification of the assembly (10) for different pressures being a matter of altering the areas S1 and S2 and the bias force of the calibrated compression spring 70. Such amendments would be simple for a person skilled in the art of hydraulic valves.

The embodiment described above is given by way of example only. Other forms of hydraulic control valve assembly according to the invention may also be constructed.

I claim:

1. A hydraulic control valve assembly comprising a cut-off valve, a control valve and means for connecting said assembly to at least a pressurised fluid supply line, a hydraulic apparatus line and a pressure fluid return line, said valve assembly being constructed and arranged such that:

(i) said cut-off valve is bistable between a primed and a closed position and said cut-off valve is arranged to permit flow of pressurised fluid from said supply line to said hydraulic apparatus line when said cut-off valve is in said primed position and said cut-off valve is arranged to cut-off said flow when it is in said closed position; and (ii) said control valve is arranged to control in a continuously variable manner the pressure of fluid supplied from said valve assembly to said hydraulic apparatus line, and wherein means are provided to:

(a) initiate priming of said cut-off valve;

(b) complete priming of said cut-off valve provided fluid in said supply line is at a pressure above a first predetermined pressure, and (c) maintain priming of said cut-off valve provided fluid in said supply line remains at a pressure above a second predetermined pressure.

2. A hydraulic control valve assembly as claimed in claim 1 wherein said means for initialising and completing priming of said cut-off valve include first pressurised fluid supply means for supplying pressurised fluid to said cut-off valve, said first supply means being controlled by said control valve.

3. A hydraulic control valve assembly as claimed in claim 2 wherein said means for maintaining the priming of the cut-off valve comprise second pressurised fluid supply means for supplying pressurised fluid to said cut-off valve, said second supply means being controlled by actuation of said cut-off valve, said supply means being arranged to supply fluid when said cut-off valve is primed and to cut-off supply of fluid when said cut-off valve is not primed.

4. A hydraulic control valve assembly as claimed in claim 3 wherein the said cut-off valve comprises a cut-off valve casing and a cut-off valve member, and wherein said second pressurised fluid supply means comprise a port in said cut-off valve casing, said port being arranged to be obstructed by said cut-off valve member when said cut-off valve is not primed, and said port being arranged to be open when said cut-off valve is primed.

5. A hydraulic control valve assembly as claimed in claim 4, wherein said control valve comprises a single control valve member and a control valve casing in which casing said control valve member is received, said control valve member having means for controlling the supply of hydraulic fluid via said first pressurised fluid supply means to said cut-off valve, said control valve member also having means for controlling fluid pressure to said hydraulic apparatus line.

6. A hydraulic fluid control valve assembly as claimed in claim 5, wherein said cut-off valve and said control valve together constitute an integral unit, said unit comprising a casing with at least two bores therein in which bores are respectively received said cut-off valve member and said control valve member, one or more channels being provided in said casing communicating between said at least two bores.

7. A clutch control system comprising a clutch pedal, a hydraulically actuated clutch, and a hydraulic valve assembly as defined in claim 5 connected between said clutch pedal and said hydraulically actuated clutch.

8. A clutch control system as claimed in claim 7, wherein said control valve member is arranged for actuation by said clutch pedal via hydraulic or mechanical means.

9. A clutch control system comprising a clutch pedal, a hydraulically actuated clutch, and a hydraulic valve assembly as defined in claim 1 connected between said clutch pedal and said hydraulically actuated clutch.

* * * * *